United States Patent
Ma et al.

(10) Patent No.: US 7,205,973 B2
(45) Date of Patent: Apr. 17, 2007

(54) GRADUAL DIMMING OF BACKLIT DISPLAYS

(75) Inventors: Dennis K D Ma, Sunnyvale, CA (US); Kayvon Fatahalian, Pittsburgh, PA (US)

(73) Assignee: Nvidia Corporation, Santa Clara, CA (US)

( * ) Notice: Subject to any disclaimer, the term of this patent is extended or adjusted under 35 U.S.C. 154(b) by 360 days.

(21) Appl. No.: 10/365,347

(22) Filed: Feb. 12, 2003

(65) Prior Publication Data

US 2004/0155854 A1    Aug. 12, 2004

(51) Int. Cl.
*G09G 3/34* (2006.01)

(52) U.S. Cl. ............... 345/102; 345/211; 345/215; 345/213; 713/320; 713/321; 713/322; 713/323

(58) Field of Classification Search ........ 345/211–213, 345/102; 713/320–324
See application file for complete search history.

(56) References Cited

U.S. PATENT DOCUMENTS

| | | | | |
|---|---|---|---|---|
| 5,406,305 A | * | 4/1995 | Shimomura et al. ........ 345/102 |
| 5,838,294 A | * | 11/1998 | Praiswater ................. 345/102 |
| 6,411,306 B1 | * | 6/2002 | Miller et al. ............... 345/690 |
| RE38,108 E | * | 5/2003 | Chee et al. ................. 345/212 |
| 6,693,612 B1 | * | 2/2004 | Matsumoto et al. .......... 345/87 |
| 6,697,953 B1 | * | 2/2004 | Collins ....................... 713/320 |
| 6,762,741 B2 | * | 7/2004 | Weindorf .................... 345/102 |
| 2002/0108011 A1 | * | 8/2002 | Tanha ......................... 710/306 |

FOREIGN PATENT DOCUMENTS

| | | | |
|---|---|---|---|
| JP | 09-026837 | * | 1/1997 |
| JP | 2000243074 | * | 9/2000 |
| JP | 2002123240 A | * | 4/2002 |

* cited by examiner

*Primary Examiner*—Richard Hjerpe
*Assistant Examiner*—Leonid Shapiro
(74) *Attorney, Agent, or Firm*—Patterson & Sheridan, LLP (57) ABSTRACT

Embodiments of the present invention generally provide methods, apparatus, systems, and articles of manufacture for gradually dimming backlit displays. The backlit displays may be gradually dimmed by reducing a level of the backlighting from an initial level to a final level in a plurality of steps over a dimming interval. The gradual dimming operations may be performed by any suitable combination of software and hardware components. For some embodiments, parameters used for the dimming, such as the dimming interval and final level of the backlighting, may be specified by a user.

30 Claims, 5 Drawing Sheets

GRADUAL DIMMING OF BACKLIT DISPLAYS

BACKGROUND OF THE INVENTION

1. Field of the Invention

Embodiments of the present invention generally relate to backlit displays and more particularly to gradually dimming backlit display.

2. Description of the Related Art

Laptop computers are typically powered from rechargeable batteries. The length of operation a user can expect from a fully charged battery (i.e., battery life) is generally proportional to the storage capacity of the battery. Advances in battery technologies have resulted in rechargeable batteries (e.g., nickel-cadmium and lithium-ion batteries) with greater storage capacities, resulting in extended battery life. However, in an effort to further extend battery life, laptop computer manufacturers also strive to reduce power consumption.

Power consumption of backlit liquid crystal displays (LCDs) may account for a large portion of overall power consumption of a laptop computer. Conventional approaches to reducing power consumption of a backlit LCD are typically limited to reducing an amount of backlighting (i.e., dimming) in a single, relatively large, step. For example, a laptop computer may be configured to dim the backlighting by a fixed percentage (e.g., 20%) in response to detecting a power supply has been unplugged from an AC power supply and that the laptop computer is being powered from the battery. As another example, a laptop computer may be configured to trigger the dimming in response to detecting a predetermined period of inactivity (e.g., no keyboard or mouse activity), which may indicate the user is not present and/or not working with the laptop computer.

In both of these examples of dimming, however, because the level of backlighting is reduced in a single step, the dimming may be highly noticeable to a user. In the event that the user is present, the noticeable dimming may be a source of distraction. In some cases, to reduce the likelihood of the dimming occurring while the user is present, the user may set the period of inactivity that triggers the dimming to an excessively high amount or disable the dimming entirely. As a result, the backlighting may remain at full scale longer than necessary and optimum reductions in power consumption may not be achieved, thus reducing battery life.

Accordingly, what is needed is an improved method for dimming LCD backlighting that is less noticeable to a user.

SUMMARY OF THE INVENTION

Embodiments of the present invention generally provide methods, apparatus, systems, and articles of manufacture for gradually dimming backlit displays.

One embodiment provides a method for gradually dimming backlighting of a display. The method generally includes detecting an event and, in response to detecting the event, reducing a level of the backlighting from an initial level to a reduced level in a plurality of steps over a dimming interval. The reducing may be performed in a linear or non-linear manner.

Another embodiment provides a computer-readable medium containing a program. When executed by a processor, the program performs operations including detection of specific events and, in response to detecting a specific event, reduces a level of the backlighting from an initial level to a reduced level in a plurality of steps over a dimming interval. The event may include detecting inactivity for a predetermined inactivity period.

Another embodiment provides a graphics processing unit (GPU). The GPU generally includes a plurality of registers for storing backlight dimming parameters received from an application program and a dimming output circuit for generating a signal for reducing a level of backlighting of a display from an initial level to a reduced level in a plurality of steps based on the backlight dimming parameters.

Another embodiment provides a backlight driver apparatus. The backlight driver apparatus generally includes a backlighting source driver for generating a signal for controlling a brightness of a backlighting source, a plurality of registers for storing backlight dimming parameters, and a dimming module configured to control the backlighting source driver to reduce the brightness of the backlighting source in a plurality of steps based on the backlight dimming parameters.

Another embodiment provides a computer system. The computer system generally includes a processor and a storage medium containing a program which, when executed by the processor, performs operations for dimming backlighting of a display, the operations comprising detecting an event and, in response to detecting the event, reducing a level of backlighting of a display from an initial level to a reduced level in a plurality of steps over a dimming interval.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Embodiments of the present invention provide methods, systems and apparatus for the gradual dimming of backlit displays. By gradually dimming a level of backlighting, in a number of small steps over a dimming interval, the dimming may be less noticeable than conventional dimming accomplished in a single, large, step. Because the gradual dimming may be less noticeable, the dimming may be controlled more aggressively (e.g., initiated sooner), which may result in greater power savings.

Figure 1:
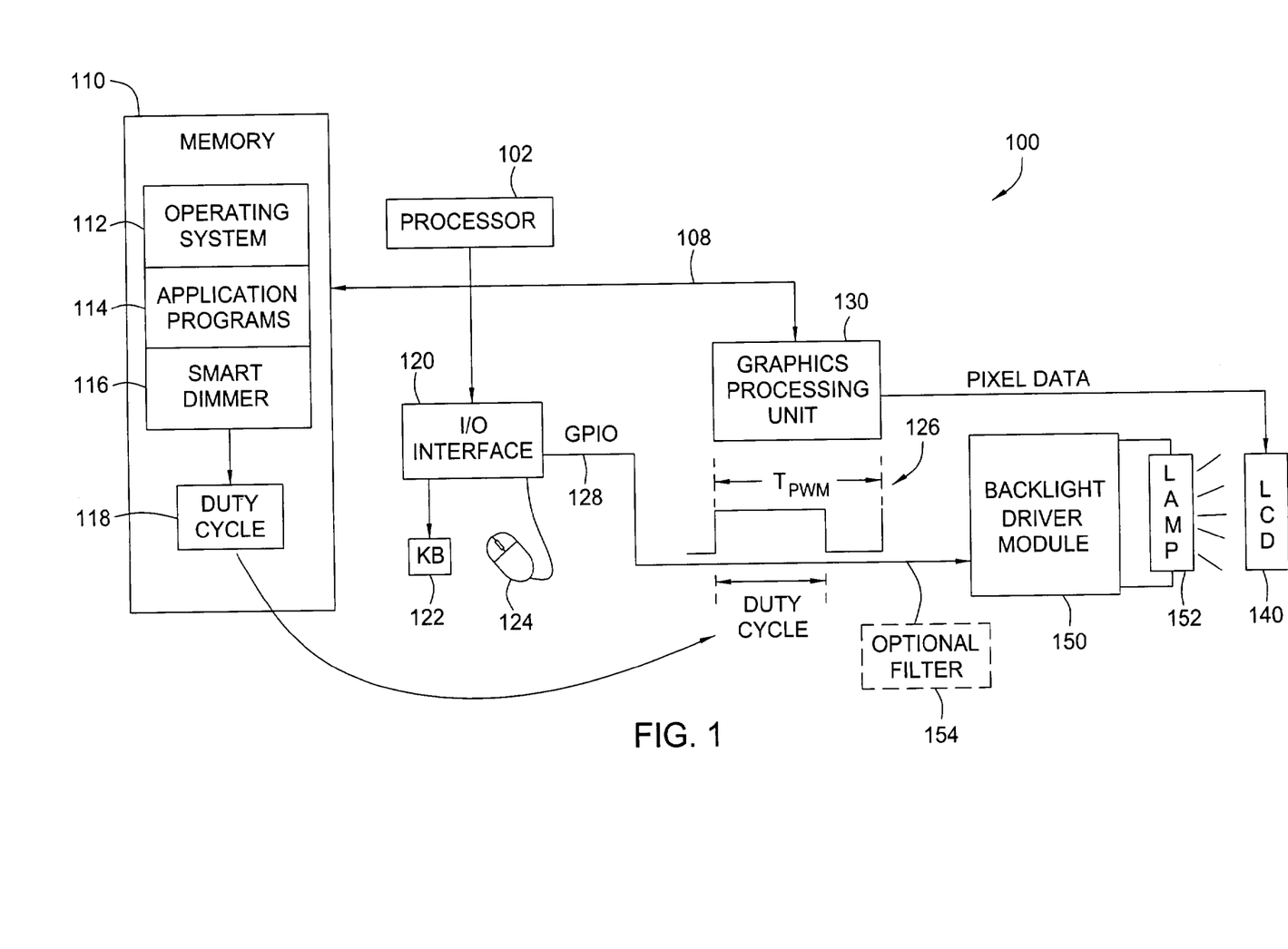
FIG. 1 illustrates an exemplary system according to an embodiment of the present invention.

Embodiments of the invention may be implemented as a program product for use with a computer system such as, for example, the computer system 100 shown in FIG. 1. The program product may include a program which, when executed by a processor 102, performs functions of the embodiments (including the methods described herein). The program product can be contained on a variety of signal-bearing media, including, but not limited to, non-writable storage media (e.g., read-only memory devices, such as CD-ROM disks), alterable information stored on writable storage media (e.g., floppy disks, CD-R/W disks), or information conveyed to a computer by a communications medium, such as a computer network, telephone network, or wireless network, including the Internet.

In general, the computer system 100 may represent any type of computer, computer system or other programmable electronic device with a backlit display (illustratively, shown as a backlit LCD 140). For example, the computer system 100 may represent a desktop computer, a portable computer (e.g., a laptop computer), a handheld computer, and any electronic device with an embedded controller, such as a copy machine, video camera, digital camera, or cellular phone. While the computer system 100 is shown with the backlit LCD 140, the computer system 100 may also include any other type of backlit display presently known or to be developed.

The computer system 100 may also include an input/output (I/O) interface 120, a graphics processing unit (GPU) 130, and a backlight driver module (150). The I/O interface may allow the processor 102 to receive user input from various input devices, such as a keyboard 122 and a mouse 124, via a bus 108. The GPU 130 may receive graphical information from the processor 102 via the bus 108, and transform the graphical information into pixel data to be sent to the LCD 140. The backlight driver module 150 may be used to generate an AC voltage signal to illuminate a lamp 152 used for backlighting the LCD 140. In general, the lamp 152 may be any suitable backlighting source, such as a cold cathode fluorescent lamp (CCFL).

Computer system 100 is shown comprising at least one processor 102, which obtains instructions and data via the bus 108 from a main memory 110. The processor 102 could be any processor adapted to support the methods of the invention. The main memory 110 is any memory sufficiently large to hold the necessary programs and data structures. Main memory 110 could be one or a combination of memory devices, including Random Access Memory (RAM), non-volatile or backup memory, (e.g., programmable or Flash memories, read-only memories, etc.). As illustrated, the computer system may also include an operating system 112 (e.g., which may be loaded into the main memory 110). The operating system 112 is the software used for managing the operation of the computer system 100. Examples of the operating system 112 include Microsoft Windows®, UNIX, Apple OS X, and the like.

The memory 110 further includes one or more application programs 114 and a smart dimmer program 116. The application programs 114 and the smart dimmer program 116 are software program products comprising a plurality of instructions that are resident at various times in various memory and storage devices in the computer system 100. When read and executed by one or more processors 102 in the computer system 100, the application programs 114 and the smart dimmer program 116 cause the computer system 100 to perform the steps necessary to execute steps or elements embodying the various aspects of the invention. In general, the smart dimmer program 116 may be configured to interact (e.g., through various system calls, subroutine calls, drivers, etc.) with other software and hardware components of the computer system 100 (e.g., the operating system 112, the I/O interface 120 and/or the GPU 130) to control the level of backlighting of the LCD 140 via the backlight driver module 150.

Gradual Dimming

Figure 2:
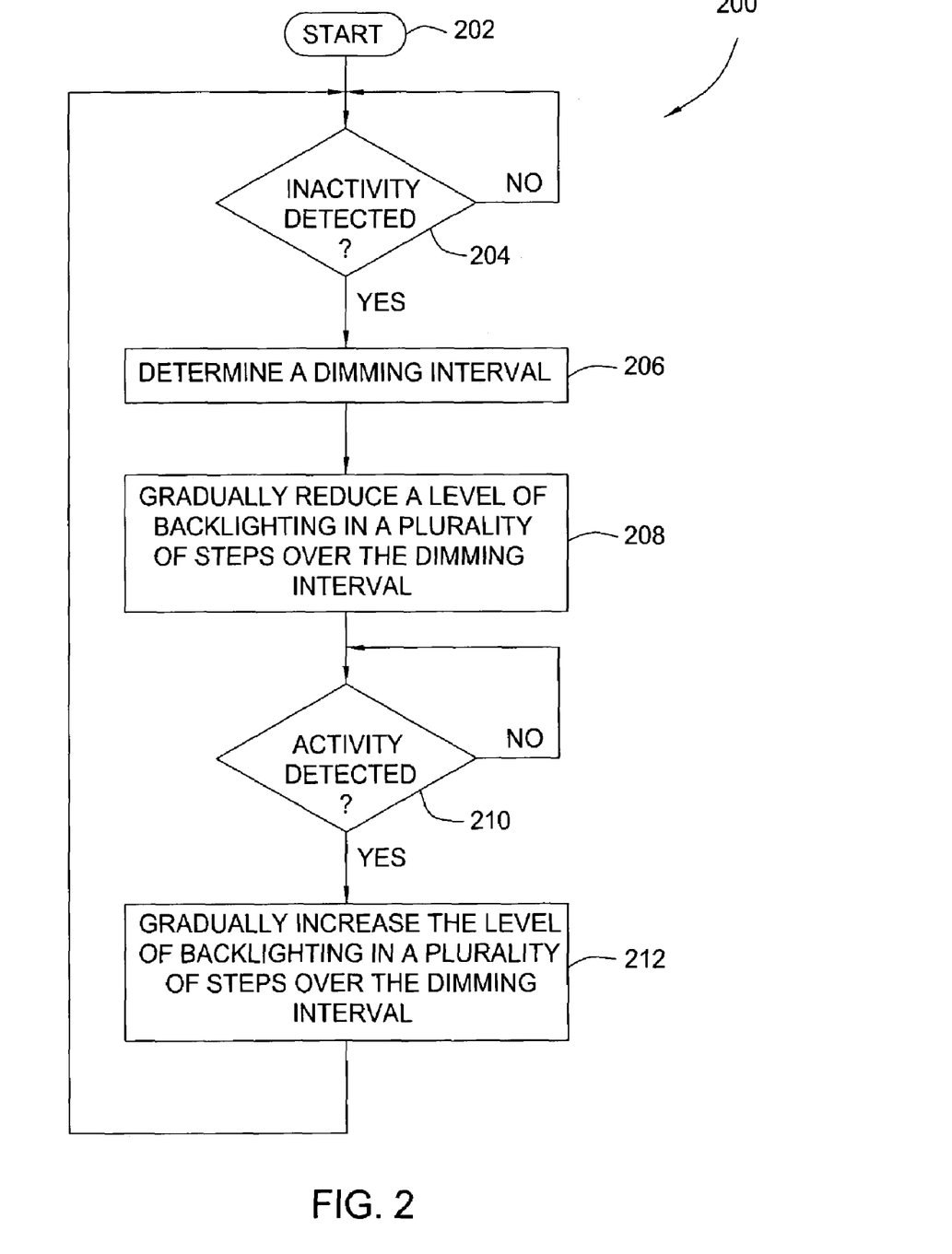
FIG. 2 illustrates exemplary operations for dimming a backlit display according to an embodiment of the present invention.

Operation of the smart dimmer program 116 may be described with reference to FIG. 2, which illustrates operations 200 for backlight control that may be performed by the smart dimmer program 116. However, the operations 200 are exemplary only, and the smart dimmer program 116 is not limited to performing the operations 200 and may perform other operations, as well. Further, as will be discussed in further detail below, some of the operations 200 may be performed by components (hardware and/or software) other than the smart dimmer program 116.

The operations 200 begin at step 202, for example, by loading or enabling the smart dimming feature from an application program 114 or operating system 112. Gradual dimming operations may be triggered upon detecting inactivity for a predetermined inactivity period, at step 204. As previously described, inactivity of the user, for the inactivity period, may be an indication the user is not present or, at least, not actively using the computer system 100, thus presenting an opportunity for dimming the display, for example, in an effort to reduce power consumption.

The inactivity period may be a constant value (i.e., "hard-coded" into a program) or may be adjustable by a user, for example, during a setup (e.g., initialization, configuration) routine using a standard graphical user interface (GUI) screen, an example of which is described below. The smart dimmer program 116 may utilize an internal timer to track the inactivity. For example, the timer may be reset to the inactivity period whenever activity is detected. Accordingly, expiration of the timer may indicate no activity has occurred within the inactivity period. The inactivity may be detected using any conventional techniques. For example, the smart dimmer program 116 may poll the operating system 112 to see if any input has been received by the I/O interface 120, for example, from any type of input device, such as the keyboard 122 or the mouse 124. Further, the smart dimmer program 116 may determine if there is any activity by the GPU 130, for example, indicating a user is watching a movie.

Once inactivity is detected, a dimming interval is determined, at step 206. At step 208, the level of backlighting is gradually reduced in a plurality of steps over the dimming interval. In general, the dimming interval is the amount of time taken to reduce a level of the backlighting from an initial level (e.g., full scale or, at least, normal operating level) to a reduced level. As with the inactivity period, the dimming interval may be a program constant or may be adjustable by a user. The user may also be able to select the final reduced level of the backlighting. In general, the greater the dimming interval, the more gradual and, thus, the less noticeable the dimming will be. Accordingly, a user may configure the smart dimmer program 116 to aggressively reduce power by dimming often (e.g., a short inactivity period) over a large dimming interval.

Any suitable mechanism may be utilized to actually implement the dimming. For example, the backlight driver module 150 may vary the AC voltage applied to the backlighting lamp 152 in response to a control signal. As illustrated, for some embodiments, the control signal may be a pulse width modulated (PWM) signal 126, having a period $T_{PWM}$. In general, the PWM signal 126 may be used to control the backlight control module 150 by varying the percentage of the period $T_{PWM}$ the PWM signal 126 is high (commonly referred to as the duty cycle). In other words, a duty cycle of 100% (always high) may represent a full scale value, while a duty cycle of 0% (always low) may represent a zero value. The PWM signal 126 may be generated on an output pin dedicated as a PWM output. Alternatively, the PWM signal may be generated on any available general purpose I/O (GPIO) pin, such as a GPIO pin 128 of the I/O interface 120 (as shown), or on a GPIO pin of the GPU 130 (not shown). The period (and, thus, frequency) of the PWM signal 126 may be set according to the input requirements of the backlight driver module.

Typically, the period $T_{PWM}$ and the duty cycle of the PWM signal 126 are controlled in software via control registers. As illustrated, the smart dimmer program 116 may vary the duty cycle of the PWM signal 126 by writing different values to a duty cycle register 118. Accordingly, the smart dimmer program 116 may gradually dim the backlighting of the LCD 140 by iteratively reducing the value of the duty cycle register 118 over the dimming interval. Typically, the PWM register 118 saturates at a maximum value corresponding to a 100% duty cycle, and does not overflow. Further, the PWM register 118 can be read by software (e.g., the smart dimmer program 116). While shown in memory 110, depending on a particular embodiment, a PWM register may actually be a control register physically located, for example, in the I/O interface 120 or GPU 130.

For some embodiments, the backlight driver module 150 may accept an analog signal, rather than a PWM signal, for controlling the brightness of the lamp 152. Accordingly, for some embodiments, an optional filter 154 may be included in the computer system 100 to convert the PWM signal 126 to an analog signal for controlling backlight driver modules 150 that accept an analog input. Alternatively, the optional filter 154 may generate an analog signal via a digital to analog (D/A) converter or digital potentiometer that the smart dimmer program 116 may control via a serial (e.g., I²C, SPI, etc.) or parallel interface. Further, for some embodiments, the smart dimmer program 116 may interface with the backlight driver module 150 directly via a serial or parallel interface to control the brightness of the lamp 152.

Regardless of the particular mechanism utilized to vary the backlighting, once reduced, the level of the backlighting may be maintained until activity is detected, at step 210. As illustrated, once activity is detected (e.g., as previously described), at step 212, the level of backlighting may be gradually increased back to the initial level, for example, as described above with reference to the dimming. Alternatively, the backlighting may be restored to the initial level rapidly. For some embodiments, a user may select whether to restore the backlighting to the initial level gradually or rapidly.

Of course, while shown as sequential, steps 208 and 210 may actually be performed concurrently. For example, the smart dimmer program 116 may monitor the computer system 100 for user activity while gradually dimming the level of backlighting at step 208. If activity is detected, the gradual dimming may cease and the level of backlighting may be restored to a full level (gradually, per step 212), or rapidly. Further, while the operations 200 illustrate gradual dimming initiated by inactivity, gradual dimming may also be initiated by other events. For example, gradual dimming may be initiated upon detecting the computer system 100 has switched from an AC power supply to a battery. The gradual dimming may also be initiated upon determining a battery level has fallen below a predetermined threshold value. Regardless of the initiating event, however, gradual reducing the level of backlighting may make the dimming less noticeable and, thus, more palatable to a user. Therefore, the user may be less likely to disable the dimming and/or the user may configure the dimming more aggressively (e.g., the user may reduce the inactivity period for triggering the dimming and/or lower the final reduced level), which may lead to greater power savings and extended battery life.

Accordingly, the length of the dimming interval (and/or the number of steps over which the backlighting is dimmed) may be designed to limit the perceptibility, to the user, of the dimming. To this end, the dimming interval may be dependent on the difference between the initial and reduced levels of the backlighting. For example, if the reduced level represents a 20% reduction in backlighting from the initial level, gradual dimming over an interval between 10 to 15 seconds may be substantially imperceptible. On the other hand, if the reduce level represents a 50% reduction in backlighting, a dimming interval on the order of between 30 to 60 seconds may result in substantially imperceptible dimming. For some embodiments, optimal values for dimming intervals may be determined by heuristic techniques. For example, trials may be performed with a group of one or more users exposed to various dimming cycles, each implemented utilizing a different combination of percentage reduction of backlighting and corresponding dimming interval. The users may be observed, or may provide feedback, in an effort to determine the perceptibility/imperceptibility of the different combinations. The results of these trials may serve as the basis of preset (i.e., hard-coded) dimming intervals, default dimming intervals, or a range of dimming intervals to present to a user for selection.

Non-linear Dimming

Figure 3A:
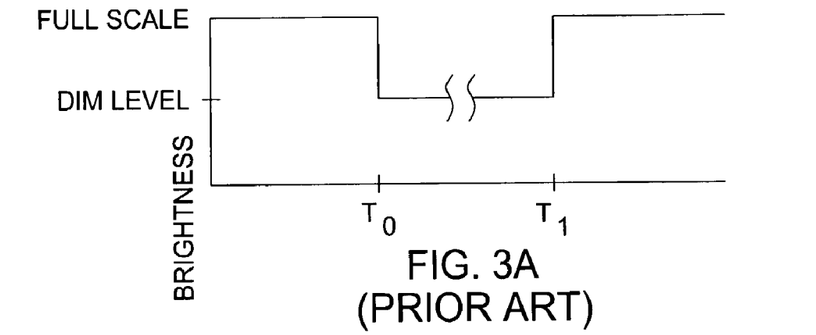
FIGS. 3A–3D are exemplary graphs illustrating backlight dimming levels versus time according to the prior art and various embodiments of the present invention.
Figure 3B:
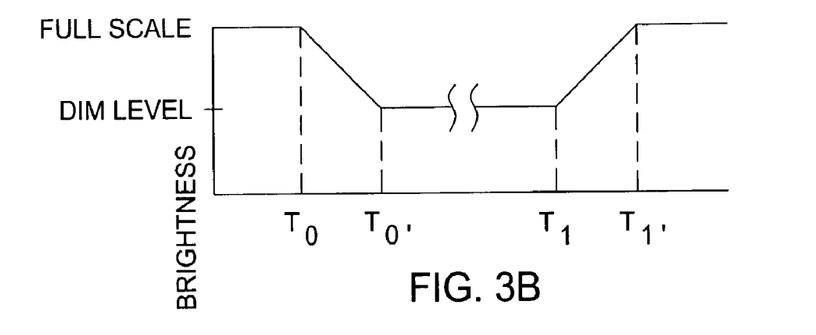
Figure 3C:
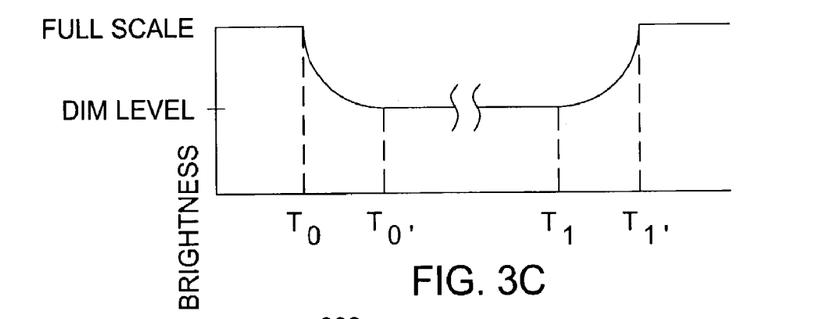
Figure 3D:
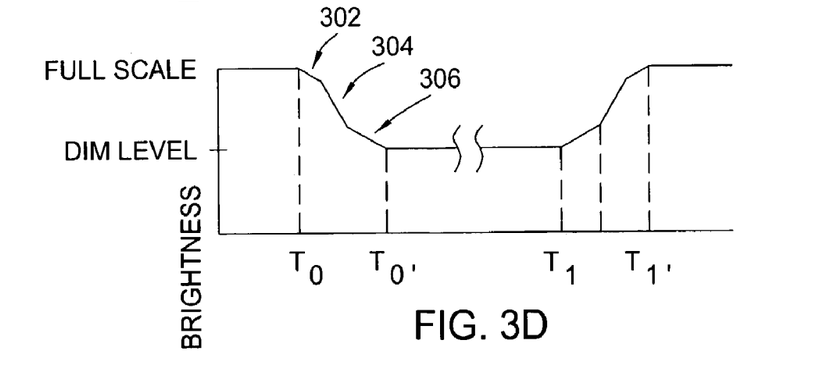

Gradual dimming of the backlighting (e.g., at step 208) may be accomplished by reducing the backlighting from the initial level to the reduced level according to a number of different techniques. For example, the level of backlighting may be reduced in a linear or non-linear manner. Some of the different techniques are illustrated in FIGS. 3A–3D, which illustrate exemplary graphs for backlighting levels versus time according to the prior art (FIG. 3A) and according to various embodiments of the present invention (FIGS. 3B–3D). As illustrated in the prior art FIG. 3A, dimming is reduced at a time $T_0$, from an initial value (labeled FULL SCALE) to a final reduced level (labeled DIM LEVEL), in a single discrete step. At a later time $T_1$, the brightness of the backlighting may be restored to the initial value in another single discrete step. For example, the times $T_0$ and $T_1$ may correspond to the detection of user inactivity and user activity, respectively.

As illustrated in FIG. 3B, however, for some embodiments of the present invention, the backlighting may be gradually reduced from the initial value to the final value in a linear manner. In other words, the level of the backlighting may be reduced in a plurality of steps, in which the level of the backlighting is reduced by an equal amount each step. As illustrated, while the inactivity is detected at $T_0$, the level of backlighting does not reach the final dim level until time $T_0'$. In other words, the difference in time between $T_0'$ and $T_0$ (i.e., $T_0'-T_0$) represents the dimming interval. While the dimming may occur in steps of equal magnitude, as the dimming level is reduced, each step may represent a larger percent reduction in the current brightness. As an example, assuming each step represents a reduction equal in magnitude to 5% of the full scale value, the initial step (from full scale) represents a 5% reduction in brightness, while a subsequent step from half scale (50%) would represent a 10% reduction in brightness.

For some embodiments, in an effort to keep the percent reduction in brightness constant for each step, the dimming may be reduced in a non-linear manner. For example, as illustrated in FIG. 3C, the dimming level may be decreased exponentially, by a constant scaling factor. As an example, if the scaling factor is 0.95 (95%), the backlighting level would be reduced by 5% each step, until the final reduced level is reached (at $T_0'$). Non-linear dimming may be accomplished by multiplying a current level of brightness by a scaling factor. Alternatively, non-linear dimming may be accomplished using values from a lookup table, for example, stored in read only memory (ROM).

As another example of non-linear dimming, the rate of dimming may be varied throughout different portions of the dimming interval. For example, the rate of dimming may be increased in the middle of the dimming interval. As illustrated in FIG. 3D, the dimming may be initially reduced gradually in a first portion 302 of the dimming interval, more rapidly in a second portion 304 of the dimming interval, and again less rapidly at a third portion 306 of the dimming interval. The number of portions over which the dimming rate is varied may also vary (three are shown) and may be dependent, for example, on the length of the dimming interval. Further, while the dimming in FIG. 3D is illustrated as piecewise linear (i.e., with a different slope for each of the portions 302–306), for some embodiments, the dimming in each of the portions 302–306 may also be non-linear in each of the portions 302–306. For example, the dimming in each portion may be reduced exponentially with different scaling factors applied in different portions, such as 5% (i.e., scaling factor=0.95) in the first portion 302, by 10% (i.e., scaling factor=0.90) in the second portion 304, and again at 5% in the third portion 306.

As illustrated in FIGS. 3B–3D, the backlighting may be restored in a similar manner to the dimming. For example, in response to detecting user activity, at a time $T_1$, the backlighting may be gradually increased from the reduced level to the initial level over a time period of $T_1'-T_1$. The time period $T_1'-T_1$ may or may not equal the dimming interval ($T_0'-T_0$). Further, as previously described, the backlighting may be restored rapidly.

Offloading Dimming to Hardware

For some embodiments, to accomplish the dimming illustrated in the FIGS. 3B–3D, above, the smart dimmer program 116 may continually reduce the level of backlighting over the dimming interval ($T_0'-T_0$). As an example (referring back to FIG. 1), the smart dimmer program 116 may continually adjust a value of the duty cycle register 118 to vary the duty cycle of the PWM signal 126 to control the backlight driver module 150. However, such continuous adjustment may place an undesirable load on system resources (e.g., the CPU 102 and memory 110). Therefore, for some embodiments, in an effort to alleviate the load placed on system resources, the smart dimmer program 116 may offload some of the dimming functions to one or more hardware components, such as the GPU 130.

Figure 4:
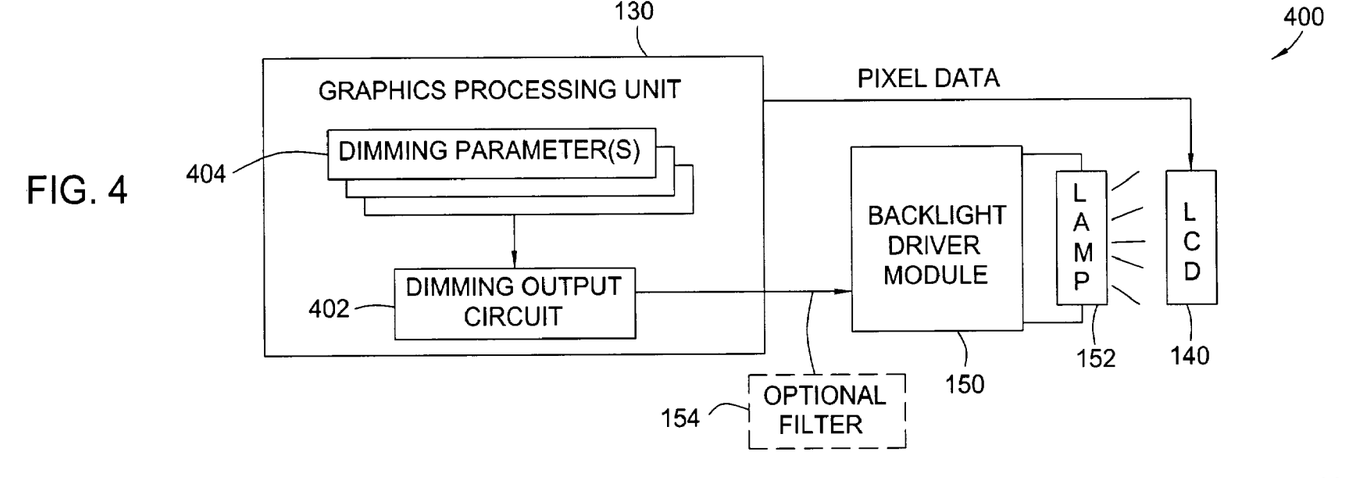
FIG. 4 illustrates an exemplary graphics processing unit (GPU) according to one embodiment of the present invention.

For example, as illustrated in an exemplary system 400 of FIG. 4, one embodiment of the graphics processing unit (GPU) 130 may include a dimming output circuit 402 configured to interface directly with the backlight driver module 150. The dimming output circuit 402 may be configured to gradually reduce the backlighting using any of the previously described linear or non-linear methods. In other words, the dimming output circuit 402 may generate any suitable signal (e.g., a PWM or analog signal) to interface with the backlight driver module 150. As previously described, depending on the backlight driver module 150 and the control signal generated by the dimming output circuit 402, the system 400 may include optional filter 154 to convert the backlight control signal to a signal compatible with the backlight driver module 150.

Operation of the dimming output circuit 402 may be determined by a set of dimming parameters 404 received, for example, from the smart dimmer program 116 (e.g., via the bus 108). The dimming parameters 404 may represent a set of registers located on the GPU 130. In other words, rather than continually adjust the backlighting value over the dimming interval, the smart dimmer program 116 may write values to the dimming parameters 404 to the GPU 130 to initiate gradual dimming. As an alternative, the dimming parameters 404 may be initiated during an initialization period (e.g., upon loading) and the smart dimmer program 116 may simply send an enable signal (e.g., by writing to a register) to the GPU 130 to initiate the gradual dimming. Regardless, the dimming parameters 404 may include various parameters that specify how the dimming output circuit 402 performs the gradual dimming.

As an example, the dimming parameters 404 may include the dimming interval ($T_{DIM}$) and a final amount of dimming (e.g., as a percentage $P_{DIM}$ of a full scale or other initial amount of backlighting $BL_{INIT}$). In other words, the final amount of backlighting $BL_{FINAL}$ may be determined by the following equation:

$$BL_{FINAL}=BL_{INIT}*P_{DIM}.$$

The dimming output circuit 402 may be configured to determine what steps to take to reach $BL_{FINAL}$ in the specified dimming interval $T_{DIM}$. In other words, the dimming output circuit 402 may be configured to determine a number of steps to take ($N_{STEPS}$), an incremental amount ($\Delta BL$) to reduce the backlighting each step, and/or an amount of time between each step ($\Delta t$). For various embodiments, one or more of the parameters $N_{STEPS}$, $\Delta BL$, and $\Delta t$ may be constant, allowing the other parameters to be determined. For example, assuming $\Delta BL$ is a constant (e.g., determined by a resolution of a PWM output signal generated by the dimming output circuit 402), the number of steps $N_{STEPS}$ and time between steps $\Delta t$ may be readily determined by the following equations:

$$N_{STEPS}=(BL_{INIT}-BL_{FINAL})/\Delta BL.$$

If the steps are to be taken in equal intervals, the time between steps $\Delta t$ is just the dimming interval $T_{DIM}$ divided by the number of steps $N_{STEPS}$:

$$\Delta t=T_{DIM}/N_{STEPS}.$$

In a similar manner, $N_{STEPS}$ and $\Delta BL$ could be determined if $\Delta t$ were a constant, just as $\Delta BL$ and $\Delta t$ could be determined if $N_{STEPS}$ were a constant.

As another example, rather than include a final amount of dimming, the dimming parameters 404 may include an increment ($\Delta_{BL}$) or scale factor ($S_{BL}$) and the number of steps ($N_{STEPS}$) to take. The dimming output circuit 402 may be configured to iteratively reduce the dimming by the specified increment or scale factor for the specified number of steps. In other words, as previously described, if the dimming is linear, the final backlighting level ($BL_{DIM}$) will be:

$$BLDIM = BLINIT - (N_{STEPS} * \Delta_{BL}).$$

If, on the other hand, the dimming is non-linear, the backlighting may be reduced by the scaling factor each step and the final backlighting level ($BL_{DIM}$) will be:

$$BLDIM = BLINIT * (S_{BL}^{N_{STEPS}}).$$

Regardless, the dimming output circuit 402 may be configured to determine the dimming interval ($T_{DIM}$) and/or the amount of time between each step ($\Delta t$). For some embodiments, $\Delta t$ may be a constant, and $T_{DIM}$ may be determined by the following equation:

$$T_{DIM} = \Delta t * N_{STEPS}.$$

In other words, the dimming interval $T_{DIM}$ may vary with the specified number of steps. Alternatively, if $T_{DIM}$ is constant, the dimming interval may vary with the number of steps:

$$\Delta t = T_{DIM} / N_{STEPS}.$$

For some embodiments, $T_{DIM}$ may be specified as one of the dimming parameters 404. Accordingly, the dimming output circuit 402 may be configured to iteratively reduce the backlighting by the specified increment $\Delta_{BL}$ (or scale factor $S_{BL}$) for the specified number of steps $N_{STEPS}$ over the specified dimming interval $T_{DIM}$.

Figure 5:
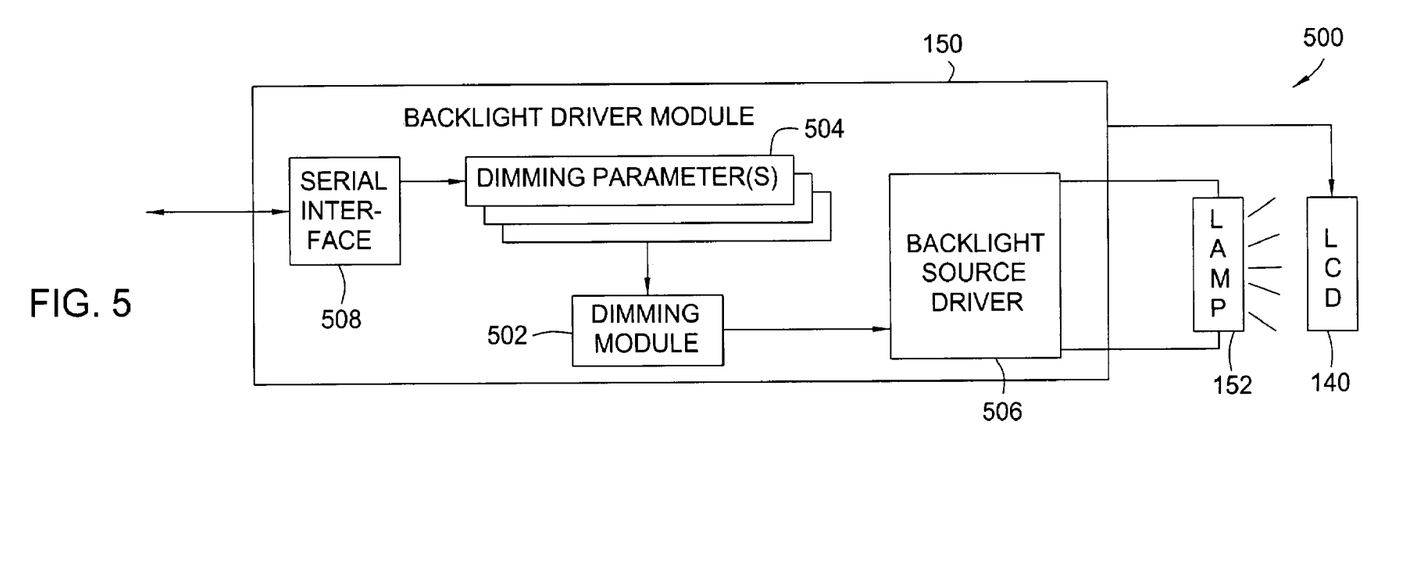
FIG. 5 illustrates an exemplary backlighting driver module according to an embodiment of the present invention.

As an alternative to implementing dimming functionality in the GPU 130, dimming functionality may also be built into the backlight driver module 150. For example, as illustrated in FIG. 5, one embodiment of the backlight driver module 150 may include a dimming module 502 configured to vary the output of a backlight source driver 506 according to dimming parameters 504. The backlight source driver 506 may be configured to vary the backlighting according to the dimming parameters 504, as described above with reference to the dimming output circuit 402 described above. In other words, the backlight source driver 502 may vary the output signal (e.g., AC voltage signal) generated to control the intensity of the lamp 152 based on the dimming parameters 504.

The backlight driver module 150 may receive the dimming parameters 504 (e.g., from the smart dimmer program 116 or the GPU 130) via any suitable interface, such as a parallel bus interface (e.g., compatible with the bus 108) or a serial interface 508. The serial interface 508 may be any suitable serial interface, such as an SPI or I²C interface. Further, the serial interface 508 may be implemented as a standard display data channel (DDC), configured to allow communications between a display and a display interface (e.g., the GPU 130) to which it is connected. While a DDC is typically configured to provide a method for the display to convey its identity to the display interface, this functionality could be expanded to allow writing and/or reading the dimming parameters 504.

User-specified Dimming Parameters

Figure 6:
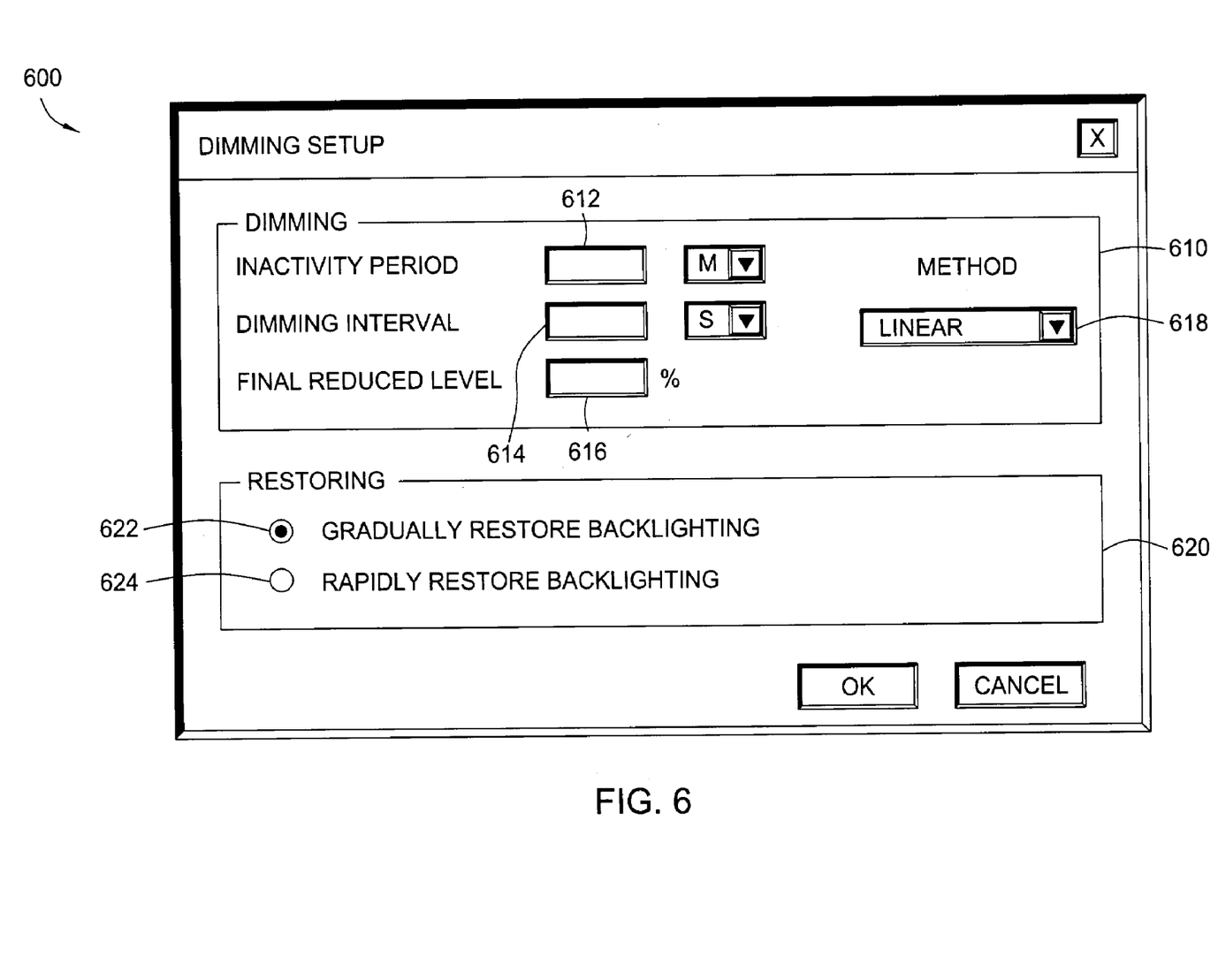
FIG. 6 illustrates an exemplary graphical user interface (GUI) screen for specifying dimming parameters according to an embodiment of the present invention.

As previously described, for some embodiments, a user may configure the smart dimmer program 116 by specifying various dimming parameters. The user may specify the dimming parameters through any suitable interface, such as a command line or graphical user interface (GUI). For example, FIG. 6 illustrates an exemplary GUI screen 600 that may be presented to a user for specifying dimming parameters.

As illustrated, the GUI screen 600 may include a window 610 with edit boxes 612, 614, and 616 for specifying an inactivity period, dimming interval, and final reduced level (of dimming), respectively. As illustrated, the inactivity period and dimming interval may be specified in minutes or seconds and the final reduced level of dimming may be specified as a percentage (e.g., of a full scale backlighting level). The dimming window 610 may also include a pull down menu 618 allowing the user to specify a dimming method. For example, the pull down menu 618 may allow the user to specify any of the dimming methods described with reference to FIGS. 3A–3D (e.g., discrete, linear, non-linear, ease-in/ease-out, etc.). Of course, other GUI screens may allow the entry of other dimming parameters (e.g., the previously described dimming parameters $N_{STEPS}$, $\Delta t$, $\Delta_{BL}$, and $S_{BL}$), depending on a specific implementation.

The GUI screen 600 may also include a window 620 for specifying how to restore backlighting back to a normal, or non-dim, level (e.g., in response to detecting user activity). As illustrated, the window may include radio buttons 622 and 624 allowing a user to specify whether to gradually restore backlighting (e.g., according to the specified dimming parameters) or rapidly restore backlighting, respectively.

Accordingly, embodiments of the present invention provide methods, apparatus, systems, and articles of manufacture for performing gradual dimming of a backlit display. The gradual dimming may be less noticeable than the sudden discrete dimming of conventional dimming techniques. Because the gradual dimming may be less noticeable, users may be more likely to enable the dimming and/or configure the dimming more aggressively (e.g., by reducing inactivity periods for initiating the gradual dimming and/or reducing a final reduced level of the backlighting), which may result in reduced power consumption and greater battery life.

While the foregoing is directed to embodiments of the present invention, other and further embodiments of the invention may be devised without departing from the basic scope thereof, and the scope thereof is determined by the claims that follow.

What is claimed is:

1. A method for dimming backlighting of a display comprising:
   detecting a period of inactivity;
   in response to detecting the inactivity, determining a dimming interval over which a level of the backlighting is to be reduced from an initial level to a reduced level that is greater than zero;
   reducing the level of the backlighting from the initial level to the reduced level in a plurality of steps over the dimming interval, wherein the duration of the steps is variable;
   detecting the occurrence of activity; and
   in response to detecting the activity, increasing the level of backlighting to the initial level,
   wherein a length of the dimming interval is designed to limit perceptibility, to a user, of the reduction in backlighting level by reducing the backlighting at different rates over different portions of the dimming interval, each of the different rates being related to a non-zero scaling factor that is applied to a current backlighting level for a corresponding portion of the dimming interval and the current backlighting level is less than the initial level but greater than the reduced level.

2. The method of claim 1, wherein the length of the dimming interval is dependent on the difference between the initial and reduced levels.

3. The method of claim 1, further comprising receiving, from a user, the dimming interval.

4. The method of claim 3, further comprising receiving, from the user, the reduced level.

5. The method of claim 1, wherein the reducing comprises reducing the level of the backlighting from the initial level to the reduced level in a non-linear manner.

6. The method of claim 5, wherein reducing the level of the backlighting from the initial level to the reduced level in a non-linear manner comprises iteratively reducing the level of the backlighting by the non-zero scale factor in each of the plurality of steps.

7. The method of claim 1, wherein the increasing comprises increasing the level of backlighting to the initial level in a plurality of steps.

8. The method of claim 1, wherein the reducing comprises adjusting a duty cycle of a pulse width modulated (PWM) signal.

9. The method of claim 8, wherein adjusting the duty cycle of the PWM signal comprises writing to a register of a graphics processing unit (GPU).

10. The method of claim 1, wherein the reducing comprises sending a value to a backlight driver module.

11. The method of claim 1, wherein the display is a liquid crystal display (LCD) of a laptop computer.

12. The method of claim 1, wherein the display is a liquid crystal display (LCD) of a handheld computing device.

13. A method for dimming backlighting of a display comprising:
   determining a dimming interval over which a level of the backlighting is to be reduced from an initial level to a reduced level that is greater than zero; and
   reducing a level of the backlighting from the initial level to the reduced level in a plurality of variable duration steps over the dimming interval,
   wherein the step of reducing comprises reducing the backlighting at a first rate over a first portion of the dimming interval and at a second rate over a second portion of the dimming interval, and the first rate is related to a first non-zero scaling factor that is applied to the initial level and the second rate is related to a second non-zero scaling factor that is applied to a current backlighting level for a first portion of the dimming interval, the current backlighting level being less than the initial level but greater than the reduced level.

14. The method of claim 13, wherein the determining comprises receiving the dimming interval from a user.

15. The method of claim 13, wherein the reducing comprises iteratively reducing the level of the backlighting by a dimming scale factor in each of the plurality of steps.

16. The method of claim 13, wherein the first rate is less than the second rate.

17. A graphics processing unit (GPU) comprising:
   a plurality of registers for storing backlight dimming parameters received from an application program;
   a dimming output circuit for generating a signal for reducing a level of backlighting of a display from an initial level to a reduced level that is greater than zero in a plurality of steps over a dimming interval based on the backlight dimming parameters,
   wherein the backlight dimming parameters include a dimming increment and a number of steps, and the dimming output circuit is configured to reduce the level of backlighting by the dimming increment for the number of steps, and
   wherein the backlighting dimming parameters also include a dimming interval and a dimming step interval, and
   the dimming output circuit is configured to reduce the level of backlighting by the dimming increment for the number of steps over the dimming interval by applying a different non-zero scaling factor to a current backlighting level for each of the steps so that the current backlighting level is less than the initial level but greater than the reduced level.

18. The GPU of claim 17, wherein the dimming output circuit is configured to reduce the level of backlighting to the reduced level over the dimming interval in a non-linear manner.

19. The GPU of claim 17, wherein:
   the dimming output circuit is configured to reduce the level of backlighting by the dimming increment for the number of steps, the time between steps determined at least in part by the dimming step interval.

20. The GPU of claim 17, wherein:
   the backlight dimming parameters include a dimming interval and the reduced level; and the dimming output circuit is configured to reduce the level of backlighting to the reduced level over the dimming interval.

21. The GPU of claim 17, wherein:
   the backlight dimming parameters include a dimming scale factor; and
   the dimming output circuit is configured to iteratively reduce the level of backlighting by the dimming scale factor for each of the number of steps.

22. A backlight driver apparatus comprising:
   a backlighting source driver for generating a signal for controlling a brightness of a backlighting source;
   a plurality of registers for storing backlight dimming parameters received from an application program; and
   a dimming module configured to control the backlighting source driver to reduce the brightness of the backlighting source in a plurality of steps over a dimming interval based on the backlight dimming parameters, wherein
   the backlight dimming parameters include a dimming increment, a dimming step interval, and a number of steps,
   the dimming module is configured to reduce the level of backlighting by the dimming increment for the number of steps,
   the backlight dimming parameters include non-zero dimming scale factors and a number of steps, and
   the dimming module is configured to reduce the level of backlighting to a reduced level that is greater than zero by applying the dimming scale factors to a current backlighting level for the number of steps, wherein the current backlighting level is less than an initial level of the backlighting and greater than the reduced level.

23. The backlight driver apparatus of claim 22, wherein the backlight driver apparatus is configured to receive the backlight dimming parameters from an external device via a serial interface.

24. The backlight driver apparatus of claim 23, wherein the serial interface is an $I^2C$ interface.

25. The backlight driver apparatus of claim 22, wherein the dimming module is configured to reduce the level of backlighting over the dimming interval in a non-linear manner.

26. A system comprising:
a processor; and
a computer program which, when executed by the processor, performs operations for dimming backlighting of a display, the operations comprising detecting an event and, in response to detecting the event inactivity, determining a dimming interval over which a level of the backlighting is to be reduced from an initial level to a reduced level that is greater than zero, and reducing the level of backlighting of a display from the initial level to the reduced level in a plurality of steps over a dimming interval to produce an intermediate level of backlighting that is less than the initial level but greater than the reduced level,
wherein the reducing comprises reducing the level of the backlighting from the initial level to the reduced level in a non-linear manner in a plurality of variable duration steps over the determined dimming interval, and the reducing comprises reducing the backlighting at different non-zero scaling factors over different portions of the dimming interval.

27. The system of claim 26, wherein adjusting the signal generated by the backlight driver apparatus comprises writing a value to a register of a backlight driver apparatus.

28. The system of claim 27, wherein:
the computer system further comprises a graphical processing unit (GPU); and
the reducing comprises adjusting a duty cycle of a pulse width modulated (PWM) signal generated by the GPU.

29. The system of claim 28, wherein the computer system further comprises a filter circuit for converting the PWM signal generated by the GPU to an analog signal.

30. The system of claim 26, wherein:
the computer system further comprises a graphical processing unit (GPU); and
the reducing comprises adjusting an amplitude of an analog signal generated by the GPU.

* * * * *

UNITED STATES PATENT AND TRADEMARK OFFICE
CERTIFICATE OF CORRECTION

| | | |
|---|---|---|
| PATENT NO. | : 7,205,973 B2 | Page 1 of 1 |
| APPLICATION NO. | : 10/365347 | |
| DATED | : April 17, 2007 | |
| INVENTOR(S) | : Ma et al. | |

It is certified that error appears in the above-identified patent and that said Letters Patent is hereby corrected as shown below:

On the cover sheet, item 73, please replace "Nvidia", with --NVIDIA--

In column 11, line 45, please replace "interval, and", with --interval and--

In column 12, line 25, please replace "The GPU of claim 17, wherein:

the backlight dimming parameters include a dimming interval and the reduced level; and the dimming output circuit is configured to reduce the level of backlighting to the reduced level over the dimming interval.", with

--The GPU of claim 17, wherein:

the backlight dimming parameters include a dimming interval and the reduced level; and the dimming output circuit is configured to reduce the level of backlighting to the reduced level over the dimming interval.--

Signed and Sealed this

Twenty-ninth Day of April, 2008

JON W. DUDAS
*Director of the United States Patent and Trademark Office*